United States Patent [19]

Keester et al.

[11] Patent Number: 5,540,621

[45] Date of Patent: Jul. 30, 1996

[54] ROTARY COUPLING APPARATUS USING COMPOSITE MATERIALS

[75] Inventors: Louis J. Keester; Brian E. Spencer; Barry J. Larson; Duane V. Byerly, all of Lincoln, Nebr.

[73] Assignee: Addax, Inc., Lincoln, Nebr.

[21] Appl. No.: 537,889

[22] Filed: Jun. 18, 1990

Related U.S. Application Data

[63] Continuation-in-part of Ser. No. 231,067, Aug. 11, 1988, abandoned.

[51] Int. Cl.⁶ .................................................... F16D 3/78
[52] U.S. Cl. ................................................................ 464/93
[58] Field of Search ................................... 464/93–95, 98, 464/99

[56] References Cited

U.S. PATENT DOCUMENTS

| | | | |
|---|---|---|---|
| 1,204,737 | 11/1916 | Briscoe | 464/94 X |
| 1,537,790 | 5/1925 | Alpe | 464/93 |
| 1,546,755 | 7/1925 | Schulte | 464/95 |
| 1,569,838 | 1/1926 | Macdonald | 464/95 |
| 1,575,927 | 3/1926 | Morse | 464/94 |
| 2,041,104 | 5/1936 | Ballman | 464/94 |
| 3,229,480 | 1/1966 | Seigel et al. | 464/95 |
| 4,738,650 | 4/1988 | Hojo et al. | 464/93 X |
| 4,790,794 | 12/1988 | Takeda et al. | 464/93 |

FOREIGN PATENT DOCUMENTS

| | | | |
|---|---|---|---|
| 530946 | 12/1957 | Italy | 464/93 |
| 45-2482 | 1/1970 | Japan | 464/93 |
| 321999 | 11/1929 | United Kingdom | 464/93 |
| 696719 | 9/1953 | United Kingdom | 464/93 |
| 707524 | 4/1954 | United Kingdom | 464/93 |
| 1054025 | 1/1967 | United Kingdom | 464/93 |

*Primary Examiner*—Daniel P. Stodola
*Attorney, Agent, or Firm*—Vincent L. Carney

[57] ABSTRACT

To couple a driving shaft of a machine to a driven shaft, a coupling assembly is mounted to the driving and driven shafts and includes a flexible coupling element. The flexible coupling element includes a plurality of first fasteners adapted to be connected to the driving shaft and a plurality of second fasteners adapted to be connected to the driven shaft. A plurality of fibers connects different ones of the first fasteners to different ones of the second fasteners so that the first fasteners applies force to the second fasteners to transmit torque. The filaments or fibers are looped around the fasteners and the coupling element has a thickness in the range of 1 percent to 10 percent of its diameter.

21 Claims, 7 Drawing Sheets

5,540,621

ROTARY COUPLING APPARATUS USING COMPOSITE MATERIALS

This application is a continuation-in-part, of application Ser. No. 07/231,067, filed Aug. 11, 1988, now abandoned.

BACKGROUND OF THE INVENTION

This invention relates to methods and apparatus for coupling rotating shafts together and to methods of fabricating coupling elements to connect rotating shafts one to the other.

In one class of coupling techniques for rotating shafts, at least one integrally formed coupling element is coupled by one group of circumferentially spaced fasteners to a first shaft and by a second group of circumferentially spaced fasteners to a second shaft. In this class of coupling elements, there are no moving parts except for flexing of the coupling element during rotation.

During rotation of this class of coupling element, the fasteners of the driving shaft apply force to the fasteners of the driven shaft through the coupling element so that the driver applies force to the coupling element which in turn applies force to the fasteners of the driven shaft and thus the driven shaft. The coupling element includes an even number of holes and the holes may include bushings to receive fasteners for the driver and the load so that a fastener to the driver pulls a fastener adjacent to it for the load through the coupling element.

In a prior art type of coupling technique of this class of coupling techniques, the coupling elements are metallic discs that are sufficiently thin to bend or flex and thus accommodate misalignment of the driver and load without intentional relative motion between the metal discs and without rolling or sliding parts. This prior art type of coupling in some embodiments uses a series or stock of thin metal discs. Because the discs are thin, they are capable of flexing and because a number of them are stacked, they may accommodate heavier loads.

This prior art type of coupling technique has several disadvantages such as: (1) if a single thick metal disc is utilized, it is not sufficiently flexible and does not permit a high degree of misalignment without imparting forces to the shaft and bearings of the driven shaft that cause excessive wear; (2) if a number of thin discs are utilized to permit greater flexibility, then there is some movement between the discs and the motion causes wear; (3) the coupling is subject to corrosion; and (4) such couplings are typically limited to approximately ¼ degree misalignment for normal fatigue life and ½ degree for almost immediate failure.

Other types of prior art coupling techniques use elastomeric coupling elements, or elements formed of elastomeric material with wire or cord embedded in it. Such couplings have a disadvantage of not being able to handle large loads without excessive heating or fracturing in tension.

SUMMARY OF THE INVENTION

Accordingly, it is an object of the invention to provide a novel technique for coupling rotating shafts.

It is a further object of the invention to provide a novel coupling element.

It is a still further object of the invention to provide a novel technique for making coupling elements.

It is a further object of the invention to provide a composite coupling element which utilizes the high tension strength and flexibility of fibrous strands to provide a coupling element that permits a wide range of misalignments and yet delivers high power and high torque.

In accordance with the above and further objects of the invention, a composite coupling element includes an element body, a plurality of first fastening means for fastening the element body to a driving shaft and a second plurality of fastening means for fastening the element body to a driven shaft. The first and second plurality of fastening means are arranged in one or more circles and alternate in position with each other so that one of the first plurality of fastening means is always next to two of the fastening means in the second plurality of fastening means. The composite body includes strands of continuous fiber connecting said first and second fastener means so that the first fastener means applies force to the second fastener means through strands within a composite body.

In the preferred embodiment, the first and second plurality of fasteners are in a single circle but they may be in different circles if they are sufficiently aligned to provide relatively smooth pulling through the strands. The diameter from the center of rotation of the element to the circle of fasteners is sufficiently large to reduce stresses caused by torque transmission and axial misalignment to the design tolerance and small enough to be light in weight and easy to install. The number of fastening means and segments between adjacent fastening means is sufficiently large to maintain the stresses caused by torque transmission within tolerable limits and sufficiently to reduce stresses caused by axial and angular misalignment.

The number of fasteners and segments between fasteners is greater than twice the torque provided by the driving shaft to the driven shaft divided by: (1) the radius of the coupling element from its center of rotation to the center of a fastening means; (2) the total cross sectional area of the strands; (3) the tensile modulus of a strand; (4) the maximum strain tolerated by a strand; and (5) a safety factor of at least two. Similarly, the number of fasteners and segments are greater than twice the torque divided by: (1) the radius of the coupling element; (2) the total cross sectional area of the strands; (3) the maximum design stress of a strand; and (4) a safety factor of at least two.

"The number of fastener means is at least twice the maximum torque provided by the driving shaft to the driven shaft divided by the radius of the coupling element from fastener means to diagonal fastener means, divided by the cross-sectional area of the total fibers and by the stress caused on a fiber by the combined effects of torque and misalignment multiplied by a safety factor of at least two. The cross-sectional area of a segment filled with strands is at least equal to twice the torque expected to be imposed upon the coupling element by the driving and driven shafts divided by the radius of the coupling element, the number of segments, the modulus of elasticity, and the strain due to the combined effects of torque and misalignment multiplied by a safety factor of at least two. The cross-sectional area of a segment occupied by strands is at least equal to twice the maximum torque imposed by the driving element against the driven element divided by the radius of the coupling element, the number of segments and the maximum stress to be imposed upon a filament by the combined effects of torque and misalignment multipied by a safety factor of at least two."

The fastener means includes bushings for receiving fasteners such as bolts. These bushings are sufficiently large to spread out the stress on thee fasteners but sufficiently short to increase segment length and thus reduce strain per unit length of the strand. Generally, the diameter of the bushing measured from the bottom of a groove on the bushings that receives the strands and the center of the central opening that holds the fastener is in the range of from 1/64 to 1/4 of the diameter of the coupling element itself.

To provide adequate strength, the strands fill between 10 percent and 75 percent of the segment of the coupling between fastener means. The strands themselves may be circularly wound around the fasteners or crossed under each other and may be at differing angles with the axis of rotation of the coupling element. Preferably, the strands are circularly wound and do not cross in the center. Generally, the thickness of the coupling element in a direction perpendicular to its direction of rotation is in a range of between 0.1 percent and 2 percent of its diagonal diameter between fastening means or segments.

The strands: (1) have diameters of less then 0.2 inch; (2) contain a multiplicity of individual fibers with diameters in the range of 5 to 15 microns (3) are elongated; (4) may be of any conventional material such as glass fiber, aramid fiber, carbon fiber or linear chain polyethylene fiber; (5) have a tensile strength greater than 200,000 psi (pounds per square inch) and a tensile modulus of less than 75 million psi; and (6) the fibers and strands are substantially aligned with the longitudinal axis of the segments between bushings and have the same radius of curvature where the segments touch and curve around the outer periphery.

The tensile modulus of the strands should be twice the required torque divided by the radius of the coupling element, the cross sectional area of the segment of strands and the maximum strain due to torque tolerated by the strand multiplied by a safety factor such as two. Similarly, the strain capability of the material should be at least equal to twice the expected maximum torque divided by the radius of the coupling element, the cross sectional area of the strands in a single segment, the number of segments, and the strand modulus of elasticity, plus the strain induced by misalignment. The stress capability should be at least equal to twice the expected torque divided by the radius of the coupling element, the cross sectional strand area of a segment, and the number of segments, plus the stress induced by misalignment.

In making the composite coupling element, strands are selected to provide the proper strand modulus and strand ultimate strength to accommodate torque transmission and misalignment. They are wound in a looping pattern over adjacent bushings in a mold. The loops may be elliptical or may cross between bushings but are preferably elliptical without crossing each other between bushings.

The bands are flattened in the mold to provide a flat cross section in the range of 0.1 percent to 2 percent of the diameter between opposite fastening means within the mold and fill the mold along a segment between bushings within the range of 10 percent to 75 percent. Resin is applied to the mold either before or after the winding and the mold closed. The resulting assembly is then cured in accordance with normal methods for the resin system being used, such as by the application of heat.

After removal from the mold, the coupling element may be installed by placing it on a driven or driving shaft adjacent to a coupling flange and passing bolts through alternate ones of the means for receiving fasteners and the flange. Then the other of the driven or the driving shaft is placed adjacent to it and bolts are passed through aligned holes in it. In one embodiment, loops are formed and molded with risers and then placed over adjacent bushings and further resin added. Moreover, in embodiments that are to be rotated in only one direction, more strands are included around alternate coupling pairs that are to pull in tension than the coupling pairs which will be in compression for ease of bending.

In use, as the driving shaft rotates, the bolts connecting the flange of the driving shaft pull in tension against the bolts of the driven shaft, thus straining the strands and the resin. Some misalignment caused by out of center portions or the like, is accommodated by flexing of the composite material formed by the strands and the resin without breaking or cracking the composite.

From the above description, it can be seen that the composite flexible coupling of this invention has several advantages such as: (1) it operates for long periods of time while being subject to angular misalignments between the driver and the load of any where of between 0 degrees and 6 degrees and with axial misalignments causing size dependent excursions from the normal location of parts equivalent to that caused by angular misalignments of between 0 degrees and 6 degrees; (2) it transmits a wide range of torque in practical sizes ranging from fractional horsepower to hundreds of thousands of horsepower, being scalable from one end of the range to the other; (3) it contains no sliding, rolling or slipping parts subject to wear; (4) it requires no lubrication; (5) it induces low unwanted loads to the shafts and bearings of the driver and loads; (6) it exhibits a high inherent resistance to corrosion; (7) it provides a high resistance to fatigue failure; (8) it is inexpensive and contained in sizes practical for a wide range of applications; and (9) is low in weight.

SUMMARY OF THE DRAWINGS

The above noted and other features of the invention will be better understood from the following detailed description when considered with reference to the accompanying drawings in which.

DETAILED DESCRIPTION

Figure 1:
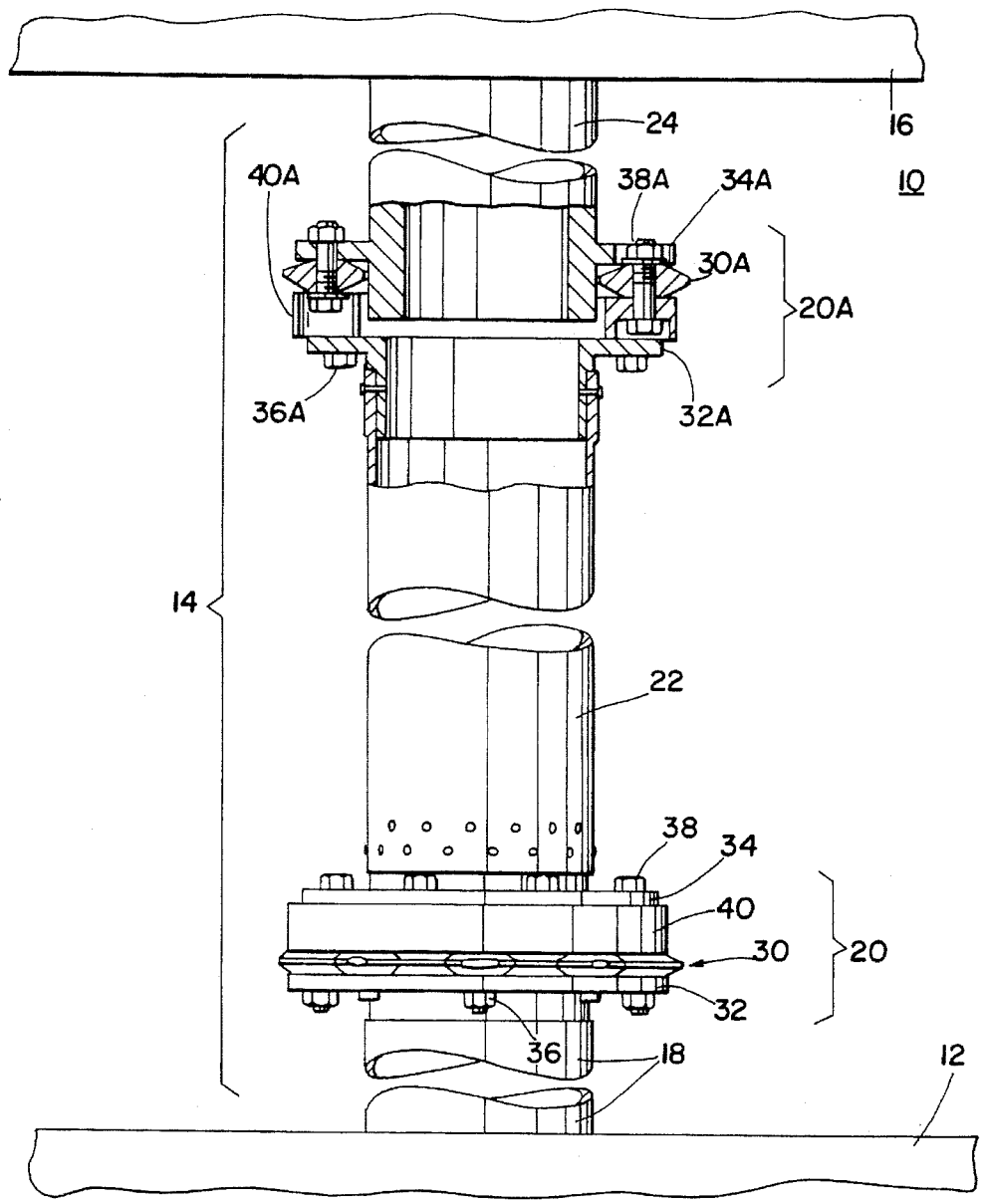
FIG. 1 is a fragmentary, broken-away, partly sectioned elevational view of an embodiment of driver, shafts, coupling elements and driven elements in accordance with an embodiment of the invention.

In FIG. 1, there is shown a machine 10 having a motor 12, a transmission assembly 14, and a driven apparatus 16. The machine 10 may be of any type and the motor 12 may be any driving apparatus which rotates the transmission assembly 14 to transmit rotational forces or torque to a driven apparatus 16. The driven apparatus 16 may also be of any type and except insofar as they cooperate with the transmission assembly 14, are not part of the invention.

Generally, the function of the transmission assembly 14 is to transmit rotary power from a motor 12 to a driven unit. The transmission assembly 14 may include elements which change motion from rotary to reciprocal or elliptical motion or the like but is intended to provide a superior rotary coupling for coupling a rotary driving unit to a rotary driven unit.

For example, one typical use of such a coupling unit is to couple a motor to a fan through an elongated shaft of a cooling tower. In this use the motor is typically mounted at the outer diameter of a tower and rotates the shaft through a coupling assembly located along a radius of the tower. Near the center of the tower, the shaft is coupled by another coupling assembly and a right angle gear box to a fan for forcing cool air across water as provided in the cooling tower. In such equipment, an electric motor may rotate a shaft having a length 4 or 20 feet long at rotational rates such as 1800 rpm (revolutions per minute). This rotational force stresses the shafts, the coupling assemblies and the bearings of the motor, particularly if the coupling members are not perfectly aligned or are slightly out of center.

The transmission assembly 14 includes a motor output shaft 18, a first coupling assembly 20, a shaft 22, a second coupling assembly 20A, and an input shaft 24 for the driven apparatus 16. The three shafts 18, 22 and 24 are shown broken away and may be of any conventional type. In some applications, the shaft 22 may be a spacer shaft and may be an elongated light weight composite shaft.

The transmission assembly 14 thus includes driven shafts and driving shafts coupled together by coupling assemblies such as 20 and 20A with the motor output shaft 18 driving the shaft 22 through the first coupling assembly 20 and the shaft 22 driving the input shaft 24 of the driven apparatus 16 through the second coupling assembly 20A. In other applications, shaft 22 and coupling 20A may be omitted and shaft 18 coupled to shaft 24 by means of coupling 20 directly.

Because the coupling assemblies 20 and 20A are identical in structure, only one description will be given and it will refer to both coupling assemblies. Identical parts in the two coupling assemblies bear identical reference numerals except the second coupling assembly 20A contains references numbers with a suffix "A". Otherwise, the descriptions will be freely mingled together to describe the parts of the coupling assemblies 20 and 20A.

As best shown with reference to the first coupling assembly 20, the coupling assemblies 20 and 20A include a composite coupling element 30, a first or driving flange 32, and a second or driven flange 34. The composite coupling element 30 is located physically between the first and second flanges and coupled to them but coupled to each of the different flanges at different locations. More specifically, the first flange 32 is fastened by several circumferentially spaced fastening means to the composite coupling element 30 at several locations and the second flange 34 is fastened by a plurality of fastening means circumferentially spaced around the composite coupling element 30 with the fastening means for each of the two different flanges being located physically between each other along the circumferential perimeter of the composite coupling element 30.

The composite coupling element 30 must be sufficiently flexible to bend without breaking between its fasteners to the driving element and the driven element. In the embodiment of FIG. 1, the bolts connecting the flange 32 and the flange 34 to the composite coupling element 30 may, because of misalignment or rotary force problems, slightly change the distance between the two and the composite coupling element 30 must bend slightly to permit that change in dimensions without undue fatigue wear. In one embodiment, it must also provide sufficient strength in both directions to permit rotation in both directions with substantial torque between the driving and the driven element. In another embodiment, the shafts are intended to turn in only one direction and the tensile-stressed strands connecting the leading bushings of the driving flange to the following bushing of the driven flange are greater in number than the strands that do not pull a following bushing and are thus in compression. Because of these functions, the composite coupling element 30 includes strands connecting the fasteners and subject to tensile forces in response to the torque but able to bend in response to forces which tend to move the fasteners together while maintaining their strength against the forces which tend to pull the fasteners away from each other.

In this specification, the word "strand" means an elongated flexible member having substantial strength in tension with a diameter no greater than 2/10ths of an inch and includes elongated members formed by twisting, weaving or grouping together smaller fibers or strands having a diameter of between 5 to 15 microns each to form a single compact elongated member which can be treated individually in the winding process. In the preferred embodiment, the strands are zero twist graphite fiber having a modulus of elasticity greater than 30,000,000 pounds per square inch, and generally in the range of 40,000,000 psi to 48,000,000 psi.

The composite coupling element 30 is generally flat and shaped as a disc. It includes means for transmitting torque between the alternate pairs of fasteners to the driving and driven element. This means for transmitting torque includes: (1) means for spreading induced loads over a wider area of the bolt; and (2) a continuous strand connection between the means for spreading load for adjacent bolts.

With this arrangement, a substantial portion of the strands carries much of the load in tension with a smaller portion of the load exerting compressive forces against different strands. The coupling element is able to flex to some degree without harm. Although it is flexible, it is not elastomeric nor subject to the fatiguing and heating properties of elastomeric materials inasmuch as it is generally not capable of stretching by more than 5 percent from a lightly loaded condition to a heavily loaded condition. The space between strands is filled with non-elastomeric resin having a modulus of elasticity of between 350,000 and 650,000. The density of the composite is less than 0.1 pounds per cubic inch.

In the preferred embodiment, the fasteners are bolts, with bolts in the first coupling assembly 20 such as 36 passing through the lower flange 32 and bolts such as 38 through the upper flange 34, such bolts being spaced circumferentially about the periphery of the composite coupling element 30 and being in alternate locations. Similarly, the bolts such as 38A are shown passing through a portion of the flexible coupling element 30A in the sectional view of the coupling assembly 20A and the bolt 36A passes through a different location.

Guard rings such as 40 and 40A for the flexible element may be provided for the nuts and bolt heads connecting the shaft 22 to the motor 12 and the driven apparatus 16. Flange elements with the guard rings 40 and 40A are riveted or otherwise fastened by any convenient means to the hollow shaft 22 to provide a strong connection.

With the structure described in connection with FIG. 1, a coupling assembly is provided which: (1) can remain in position and operate for long periods of time even though there are angular misalignments between the driver and the load of between 0 degrees and 6 degrees or axial misalignments between the driver and the driven shaft which cause size dependent excursions from the normal location of parts that are the equivalent of angular misalignments between the range of 0 degrees and 6 degrees; (2) can transmit torque ranging from fractional horsepower to hundreds of thousands of horsepower with only the scale of the items being changed for the different horsepowers without the torque causing failure; (3) does not include any rolling, sliding or slipping parts that cause frictional wear; (4) does not require lubrication; (5) does not transmit excessive loads to the shafts or the bearings of the driver and the load; (6) has high resistance to corrosion; and (7) is resistant to fatigue failure.

Figure 2:
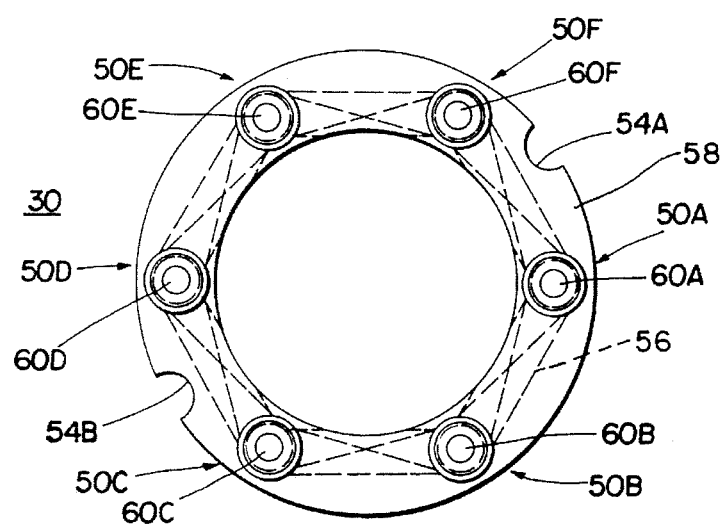
FIG. 2 is a plan view of a coupling element usable in the embodiment of FIG. 2.

In FIG. 2, there is shown a composite coupling element 30 formed as a ring having a plurality of means for receiving fasteners 50A–50F, first and second aligning notches 54A and 54B, continuous strands 56 connecting the means for receiving fasteners and a filler material 58 formed as a flat disc-like ring to coat the strands 56. With this arrangement, the ring of filler material 58 provides a damage resistant cover over the strands 56 and provides a relatively stiff flat ring. Circumferentially spaced in the ring are the fastener means 50A–50F which receive fasteners in their centers, with alternate rings being fastened to different ones of the driven and the driving members. Connecting the fastener means are the continuous strands 56 so that the fastener receiving means which are pulled by the driven element pull the fastener receiving means that connect the driven element in tension through the strands 56. Thus, one-half of the ring will be pulling in tension and the other half being in compression but the main torque force will be absorbed by the fastener receiving means and the strands. The ring itself is flexible and permits a certain amount of flexing to accommodate misalignment without excessive fatigue.

To permit easy alignment, the aligning notches 54A and 54B are provided. These are not essential but make it easier to assemble the first coupling assembly 20 (FIG. 1). Although fastener receiving means which are solid and tend to spread the force between strands 56 are used in the preferred embodiment, they may be omitted and only fasteners used in which case the strands 56 will connect fastener to fastener. Moreover, while a flat disc-shaped ring is shown, other configurations may be utilized including a solid disc-type or an annulus or donut or rectangular but having regularly spaced rings positioned to connect strands between one fastener receiving means and another fastener receiving means.

The size of the composite coupling element 30 is related to the load to be carried. To increase the load capacity, more strands are used. Similarly, to provide effective coupling, the ring should be sized to accommodate the driven and driving shafts, thus avoiding excessively sized flanges. The ring may be smaller than the shafts if a specially shaped flange is used to conveniently connect fastener means passing through the flanges to the fastener receiving means 50A–50F.

To receive fasteners such as bolts, the means for receiving fasteners 50A–50F are spool-like bushings each having a corresponding axial aperture 60A–60F passing through it perpendicular to the plane of composite coupling element and having centers which are arranged to transmit forces rotationally to other means for holding fasteners to which they are coupled by the tension strands 56.

In the preferred embodiment, the centers form a single circle but may be staggered to form more than one circle as long as the rotational forces may be passed for transmission between the driven and driving shafts. The generally circular configurations of the centers of the means for receiving fasteners form a circle about a center of rotation of the composite coupling element. The diameter of this circle affects the efficiency of the coupling element with a large diameter tending to reduce stresses caused by torque transmission and axial misalignment and a small diameter tending to be more practical, lighter and easier to balance and easier to install. Thus the diameter of these circles are compromises which are established to be sufficiently large as to reduce stresses caused by torque transmission and axial misalignment but sufficiently small to reduce weight and foster balancing.

In the preferred embodiment, a single circle of fasteners are each connected one to the other so that the coupling element may change directions with the driving shaft and still function. However, if the rotation is only in one direction, then it is only necessary for the fasteners 50A–50F which are connected to the driving flange to be connected in tension to the fasteners which are connected to the driven shaft when rotation is in that one direction by strong tensile strand members. However, connecting each of the means for receiving fasteners 50A–50F to adjacent members in a single circle forms a compact versatile coupling element.

Generally, the diameter from segment to segment is in the range of 3 inches to 60 inches and in a preferred embodiment is 7 inches. There are between six and eight means for receiving fasteners although any even number may be used. Similarly, there are generally between six and eight segments containing bundles of strands between the fastening means although any number may be used. The larger the number of segments and fastening means, the lower the stress caused by torque transmission. The smaller the number of segments, the longer each segment may be for a given diameter and this reduces stress caused by axial and angular misalignment.

Generally, the number and strand area of segments and the number and size of fastener means should be sufficient to maintain the stress on the strands caused by torque within the design tolerance and safety factor of the stress that the strands can withstand and small enough to reduce the stresses caused by axial and angular misalignment.

To provide adequate stiffness for handling, a resin is embedded in the strands. This resin may be selected from any organic resin or elastomer that exhibits a maximum elongation value at least equal to the strand yield point and providing modest mechanical properties in the required environment. Maximum elongation is sometimes referred to as strain-to-failure. The resin or elastomer must be able to stretch as much as the strands but does not have to bear significant load. Because of the small area of the fibers, there is a large surface area of contact between the resin and fibers, resulting in a large ratio of surface area to fiber volume and greater adhesion between fiber and resin. This results in less slippage and frictional heat.

In the preferred embodiment, an epoxy resin with a maximum elongation of approximately 5 percent, an elastic modulus of 500,000 psi, a glass transition temperature above 250 degrees Fahrenheit good adhesion to the fibers and good chemical resistance is utilized. Other organic matrices, including but not limited to, other thermosetting resins such as vinylesters, polyesters or phenolics, thermoplastic resins or elastomeric material may also be utilized.

For better chemical resistance and better weathering, a barrier coating is, in some embodiments, separately applied external to the resin to form the ring 58. This provides protection against damage to the strand in handling or from foreign objects. Alternatively, in some embodiments, the same material as the embedding resin may be used and concurrently applied with the embedding resin. In the preferred embodiment, the barrier coating is a separately applied elastomeric resin. Generally, the critical characteristics are sufficient bending with a thin member and a maximum elongation exceeding 5 percent. It must have a maximum elongation which is at least equal to the strain for the same torque and misalignment as provided by the strands.

Figure 3:
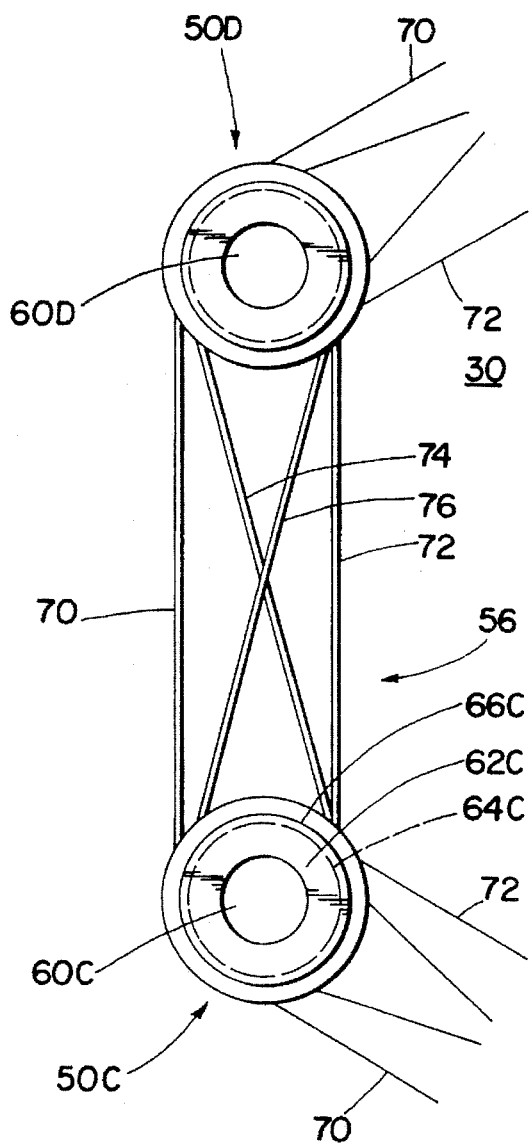
FIG. 3 is an enlarged fragmentary view of a portion of the coupling element of FIG. 2.

In FIG. 3, there is shown an enlarged fragmentary view of two of the means for receiving fasteners 50C and 50D (50A–50F are shown in FIG. 2) connected together by strands 56. The resin is not shown in this view to provide greater clarity.

Since in the preferred embodiment the bushings are all identical, only the bushing 50C will be described. It is generally spool-shaped, having: (1) a cylindrical opening 60C to receive a fastener such as a bolt; (2) generally circular side members 62C; and (3) an interior groove 64C between the circular side members adapted to receive the strands 56. An epoxy outer ring 66C may result from the application of epoxy intended to bind strands 56 together and to hold the strands within the groove 64C.

The bushings serve the function of spreading induced loads over a wider area of a fastener means such as a bolt. They provide solid areas for the bolts to bear against and solid holding surfaces for the strands 56. The diameter of the bushing from its center 60C to the bottom of the groove 64C and the width of the groove 64C (perpendicular to its radial diameter) and aligned with its axis through the center 60C together determine the area over which forces are spread for the strands 56.

A small diameter bushing and strand groove is desirable to increase segment length and reduce the stress caused by axial and angular misalignment. Thus, the diameter is selected to be sufficiently small to maintain the stresses caused by axial and angular misalignment within design tolerances but large enough to spread the stress forces in a manner that accommodates the strength of the fasteners.

Generally, the bushings from the center 60C to the groove 64C should have a dimension from 1/64 to 1/4 of the fastener circular diameter or the diameter between the centers of opposite fastener means (e.g., 60A and 60D, FIG. 2). In one embodiment, the depth of the groove for the strands is 0.125 inches but it should generally be between 0.05 and 3 inches and the bushing length in one embodiment is 0.875 inches but should generally be between 0.2 inches and 3 inches. The bushing may be made of any solid material such as metal, wood or composite construction and in some embodiments, may be entirely eliminated.

The arrangement of the strand structure is such that, for a given direction or rotation, one-half of the coupling segments carry substantially all of the torque load in tension, the preferred loading direction for filamentary materials. The coupling segments not in the primary load path may be slightly buckled by compressive forces and carry only a small part of the torque load. When directional rotation is reversed, the roles of the segments are also reversed, with the segments in tension being those previously in compression. Alternatively, the segment geometry may be selected such that the load is shared between the members in tension and the members in compression such that buckling of the compression member does not occur.

Generally, the filamentary material includes a plurality of bands such as the bands 70 and 72 which are wound around the means for receiving a fastener or a fastener itself in an elliptical or annular construction of bands so that the band 70 is on the outermost location of the composite coupling element 30 (FIG. 2) and the band 72 on the inner side near the center of rotation. Each band will include multiple strands.

Another pattern which may be used consists of cross bands such as those shown at 74 and 76 in FIG. 3 which are wound around a fastener or a means for receiving a fastener crossed between two fasteners and wound around the alternate fastener. This crossed pattern provides strength in tension at an angle to the fasteners and in some configurations is more desirable than the pattern formed by bands 70 and 72 or may be used in combination with the bands. Moreover, such a cross pattern formed by bands 74 and 76 may be at a sharp angle to the plane of the bands 70 and 72 or the plane shown for the bands 74 and 76 to increase bearing area on the fastener or means for receiving the fasteners 60C and 60D.

The wind pattern itself is designed to produce bands of continuous strand nearly aligned with the chords tangent to adjacent bushing or fasteners and of a thickness of approximately 10 percent of the maximum width across the entire segment. The preferred pattern consists of a group of two straight bands of strands and one crossed band of strands but other patterns may be used. This pattern may be repeated several times, if required, to produce the required strand cross sectional area.

The crossed bands may also be crossed in the axial direction of the bolt or of means for receiving a fastener in an over and under manner to fully occupy a space within a strand groove of the bushing such as that shown at 64C and 64D.

The bands are flattened to maintain the thickness of no more than 20 percent and preferably 10 percent of the cross sectional width of the segment to provide an adequate thinness to length and width ratio for flexibility. Preferably, the peripheral ring between the fasteners should be approximately 50 percent solidly filled with strand and at least within the range of 10 percent to 75 percent. Resin may make up the rest of the ring.

In the finished product, the segments between the means for receiving fasteners or the fasteners should have a thickness of between 0.05 percent and 4 percent of the diameter of the composite coupling element 30 (FIG. 3) diagonally across from fastener to fastener or means for receiving a fastener to means for receiving a fastener. The cross section between fasteners such as the cross section including the bands 70, 72, 74 and 76 provide two measures of cross sectional area, one of which is only the cross sectional area of the strand itself and the other of which is the total cross sectional area including both the area occupied by strands and that occupied by resin. The amount occupied by strands should be at least 10 percent of the total area and generally not more than 75 percent and should have a relatively thin dimension. Generally, this will be referred to as the cross sectional area of a segment and the length of the segment will generally be considered in this specification as the distance between adjacent means for receiving fasteners such as for example the distance between the centers 60C and 60D of the two adjacent fasteners 50C and 50D in FIG. 3.

The strands themselves may be of many types and are generally elongated and flexible, having a diameter of less than 0.2 inch and contain a multiplicity of individual fibers. They may be selected from materials such as glass fiber, aramid fiber, carbon fiber, linear chain polyethylene fiber or such other fibrous materials as may exhibit high tensile strength on the order of 300,000 psi or greater and a tensile modulus of 50 million (50,000,000) or less. Certainly, the tensile strength should be greater than 200,000 psi and the tensile modulus should be less than 75 million.

The segment cross sectional area should be sufficiently large to reduce stress caused by torque transmission but sufficiently small to reduce stress due to element bending and to reduce loading on supporting bearings. The significant portion of the cross sectional area is that filled by the strand elements. The strand modulus should be sufficiently high to reduce rotational deflections caused by torque transmission but sufficiently low to reduce stresses caused by axial and angular misalignment. The strand ultimate strength should be as high as possible and consistent with the other strand characteristics.

More specifically, the cross sectional area of the strand in a segment is sized to provide a combined stress from torque and misalignment components of 25 percent to 35 percent of the ultimate stress allowable in the strand materials. This stress level permits the predicted life of the coupling to approach 10 billion (10,000,000,000) cycles of operation or 100,000 hours at normal rotational speeds of 1800 rpm.

The width of the segment in terms of coupling material is as a practical matter from 1/64 to 1/4 of the diameter of composite coupling element 30 itself such as between centers of means for receiving fasteners 60D and 60C. The area of strand s generally equal to twice the maximum torque expected between the driven and the driving shaft divided by: (1) the radius of the coupling element 30; (2) the maximum strain permissible on a strand; (3) a safety factor of at least two; (4) the number of segments; and (5) the modulus of elasticity of a strand. Similarly, it should be at least equal to twice the maximum torque divided by: (1) the radius of the composite coupling element 30; (2) the number of segments; and (3) the maximum allowable stress due to the torque.

The strands must have a maximum elongation rating at least equal to a safty factor of at least two multiplied by the sum of: (1) the amount of stretching necessary to compensate for axial misalignment divided by the length of the segment: (2) the amount of stretching caused by angular misalignment divided by the original length; and (3) the strain induced by torque transmission. The maximum elongation must compensate for stretching caused by bending as well as torque transmission.

Generally, the individual strands should be continuous, essentially unbroken over a strand length of at least twice the separation between the centers such as 60C and 60D of the means for receiving fasteners 50C and 50D or the corresponding fasteners themselves and should be aligned within 30 degrees of a line between the centers 60C and 60D or adjacent fasteners. They should have an ultimate tensile strength of at least 300,000 psi and maximum elongation of at least 1 percent. They may be embedded in any thermosetting, thermoplastic or elastomeric resin with a yield point at least as large as that exhibited by the strand.

In the preferred embodiment, the strands are a high strength glass formulation and exhibit tensile strength nominally of 650,000 psi and 5 percent maximum elongation. Fibers with high impact resistance may be required for some applications and such strands would be aramid or polyethylene strand.

The strands may also be carbon strand, aramid strand, polyethylene strand or other strand exhibiting a tensile ultimate strength of at least 300,000 psi and tensile maximum elongation of at least 1 percent. Although the preferred embodiment uses an expoxy resin as a binder between strands, other thermosetting resins, thermoplastic resins or elastomeric resins may be utilized, so long as their tensile maximum elongation exceeds the maximum elongation of the strand and tensile strength of the resin exceeds 500 psi.

Figure 4:
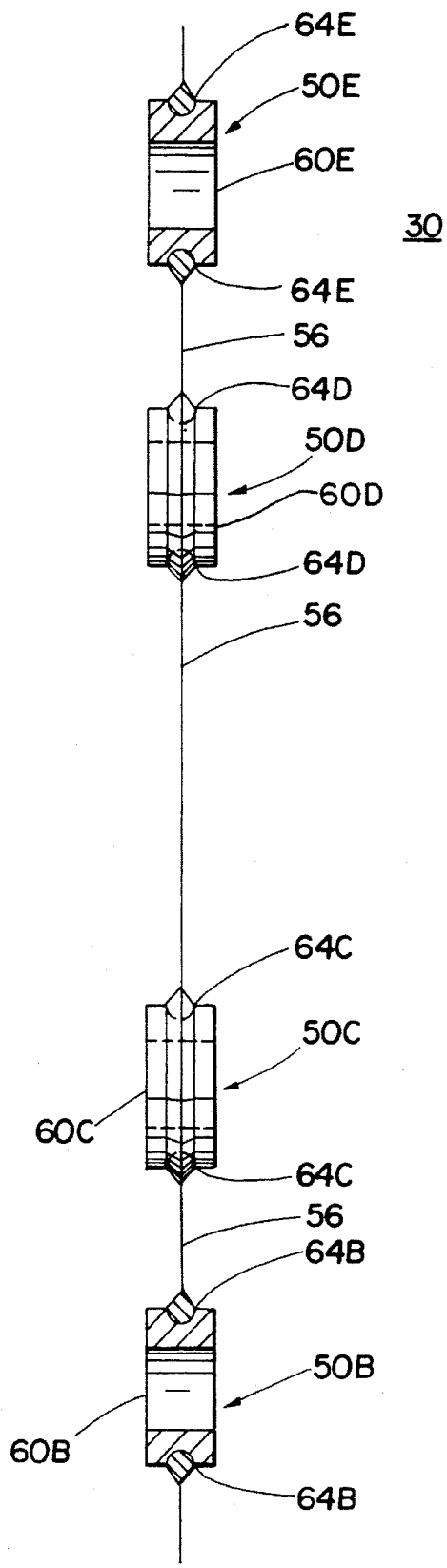
FIG. 4 is a side view, partly sectioned of the coupling element of FIG. 2.

In FIG. 4, there is shown a sectional view of the composite coupling element 30, having strands within the segment 56 wound within grooves 64E to form the segments which permit the composite coupling element 30 to stress strands in tension and provide sufficient strength.

The spools 50B–50E (50A–50F are shown in FIG. 2) are generally spools in the preferred embodiment having a diameter of approximately 1/8 of the composite coupling element 30 diameter. The grooves 64B–64E are sufficiently deep to accommodate the strand wrap over a height of approximately 3/4 of the bushing length. The bushing length is selected to be sufficient to assure clearance between the mounting flanges when misaligned and is also approximately 1/8 of the bolt circle diameter. The inner diameter of the bushing is a close fit to the bolt diameter which is selected to carry the loads to the bushings to the flanges at a stress level allowable by good design practice for the bolt material. This stress level permits the predicted life of the preferred embodiment coupling to approach 10 billion cycles of operation or 100,000 hours at normal rotational speeds of 1800 rpm.

The thickness of the segments is between 1 percent and 10 percent of its width. This is done to permit adequate flexing. If the thickness is not consistent with the torque and horsepower to be accommodated, several coupling elements may be utilized and stacked with the fasteners to share loads and yet be sufficiently thin to permit flexing.

The segments of the coupling element 30 that are in compression during a portion of a cycle of rotation may generally be permitted to buckle without harm. Thus for low torque applications, the coupling may be thin and the links that are in compression may be permitted to buckle. However, if the deformation of the compression links is such that the stresses in the outer fibers of the beam exceed twenty five percent of the ultimate strength of the fibers by a substantial amount, the coupling element may eventually prematurely fail.

To avoid such failure in high torque applications, the thickness of the links may be increased to cause them to share an adequate amount of the load without buckling, or if greater flexibility is desired, the links may be left relatively thin, of a geometry that would ordinarily result in bucking but the coupling element may be pre-tensioned by mounting it on a bolt circle slightly larger than the bolt circle used in the winding mold. This pre-tensioning is superimposed on the compressive stresses induced during operation, such that the link normally subject to compression simply is subject to a reduced tension load and hence does not buckle.

In the preferred embodiment, the strand groove length is 0.62 inches, the bolt diameter is 0.5 inches, the strand is known as S2 glass, the strand tensile modulus is 12,500,000 psi, the strand tensile strength is 650,000 psi, the strand yield point is 5 percent, the strand cross section area is (1.162 square inches, the segment width is 1 inch, the number of straight bands is 12 between fasteners, the number of cross bands between fasteners is 6, the combined performance for 30 percent stress (of maximum is equal to 8,000 inch-pounds, the axial misalignment is 0.1 inches, the angular misalignment is 3.25 degrees, and the approximate horsepower is 200 horsepower at 1800 rpm.

Although a specific design as described in connection with FIG. 4 is suitable for use in applications where approximately 200 horsepower at 1800 rpm are transmitted between the driver and driven devices, when the devices are angularly misaligned up to 2.5 degrees for long periods of time or 5 degrees for short periods of time and axially misaligned from 0.100 inches to 0.200 inches for long periods of time and short periods of time respectively, the same invention may be scaled to accommodate a range of fractional horsepower to hundreds of thousands of horsepower and from very low speeds under 1 rpm to very high speeds up to 50,000 rpm. They can also be applied to devices requiring the transmission of high static torque.

Figure 5:
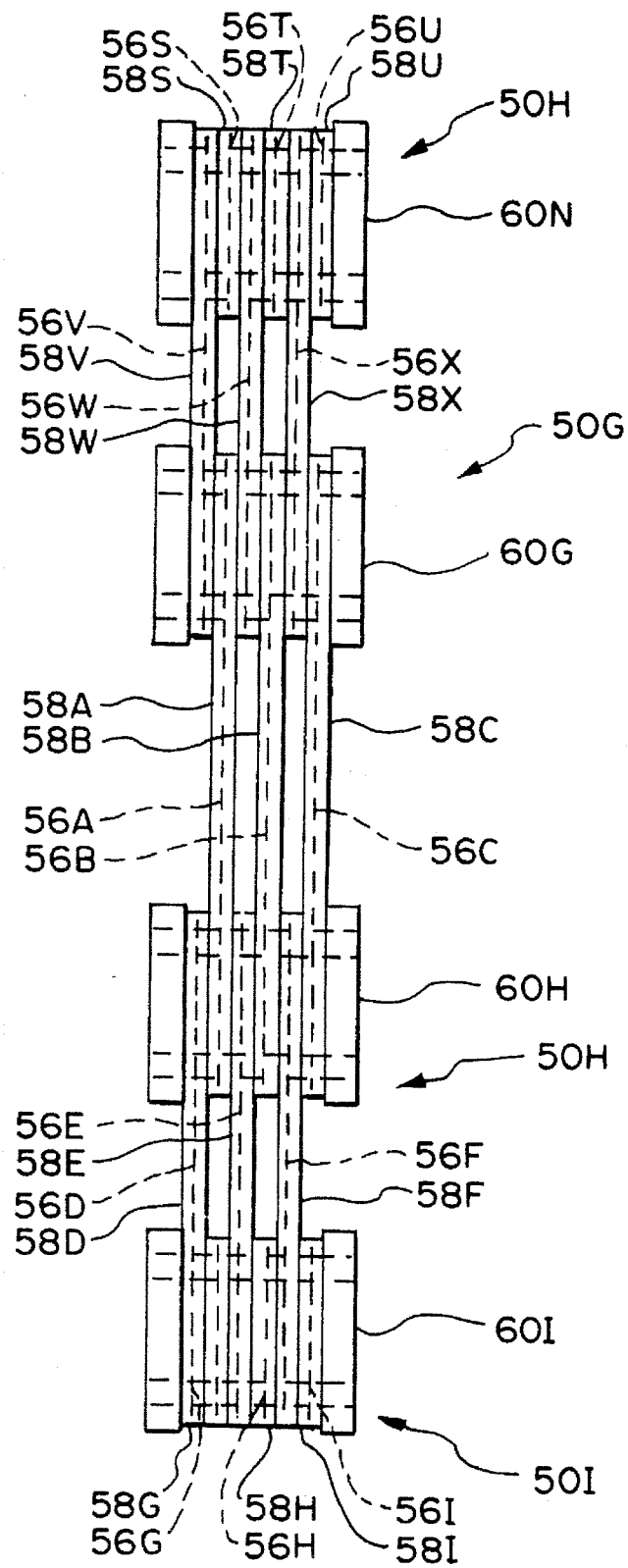
FIG. 5 is an elevational view of another embodiment of coupling element in accordance with the invention.
Figure 6:
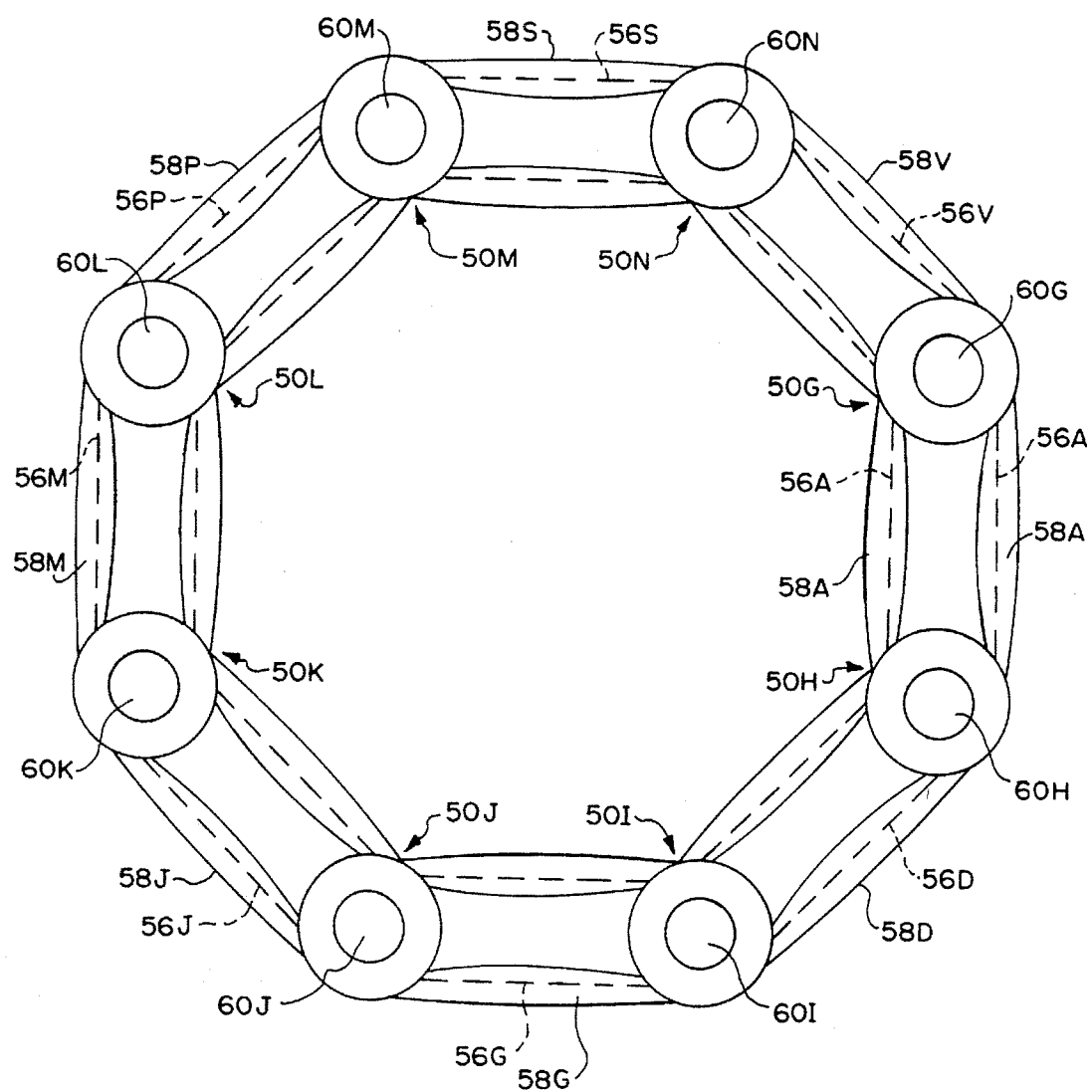
FIG. 6 is a plan view of the embodiment of FIG. 5.

In FIGS. 5 and 6, there is shown an elevational side view and plan view respectively of another embodiment of coupling element similar to the embodiment of FIGS. 2 and 4 but specially designed for heavier loading. In the embodiment of FIGS. 5 and 6, the same reference numerals are used as in the embodiment of FIGS. 2 and 4 except that letters used as suffixes for the reference numerals have been changed.

The embodiment of FIGS. 5 and 6 utilizes the same spacial and tensile strength ranges as the other embodiments and is connected in the same way to a transmission but, as best shown in FIG. 5, the embodiment of FIGS. 5 and 6 includes 26 composite segments formed in sets of three parallel sets of composite connecting segments consisting of fillers 58A–58X and corresponding filaments, fibers or strands 56A–56X to connect each pair of adjacent bushings.

In this embodiment, there are eight bushings 60G–60N with each bushing receiving six composite segments engaging it in six adjacent rings. Each of the three composite segments of combined fillers and strands connect two adjoining bushings. The strands and fillers of one bushing extending to one of its two adjacent bushings are spaced from each other on the bushing by three parallel segments of fillers and strands connecting the bushing to the other adjacent bushing. Thus, eight different chords of each of three parallel circles are formed by the composite segments, with each of the three circles having a center on a line passing through the centers of each of the bushings.

As in the other embodiments, the bushings are equidistant from each other and connected by the endless belts, fillers and strands or filaments. Unlike the previous embodiments, the fillers and strands or filaments form loops around the bushings so that there is a space where there are no fillers and no strands between parallel sides of each of the strands lying along the circle that passes through the center of all of the bushings.

In this embodiment, because there are three sets of composite endless loops linking each pair of bushings: (1) a greater load can be handled; (2) there is better cooling of each segment because of the air space between them; (3) less heat is generated from flexing because of segments that are more flexible; and (4) there is better vibration damping. Moreover, because the strands do not cross for each endless loop, there is less friction and wear of the strands and the spacing between loops aids in cooling the composite material against heating caused by the flexing.

Figure 7:
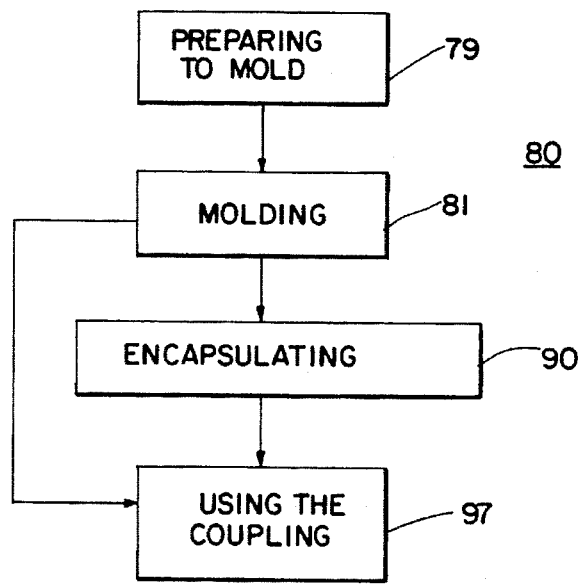
FIG. 7 is a block diagram illustrating the manufacture and use of the coupling element in accordance with an embodiment of the invention.

In FIG. 7, there is shown a block diagram of a manufacturing process 80 generally involved in the making of the composite coupling element 30 (FIGS. 1–6) and using it in a machine 10 (FIG. 1) including the step 79 of preparing to mold, the step 81 of molding, the step 90 of encapsulating, and the step 97 of using the coupling. Each of these steps includes a series of substeps that select sizes and material and prepare the proper configuration of composit coupling from the materials for the application. Normally the coupling is encapsulated after it is molded and before it is mounted for use but as indicated in FIG. 7, the coupling under some circumstances is mounted directly after molding without encapsulating.

Figure 8:
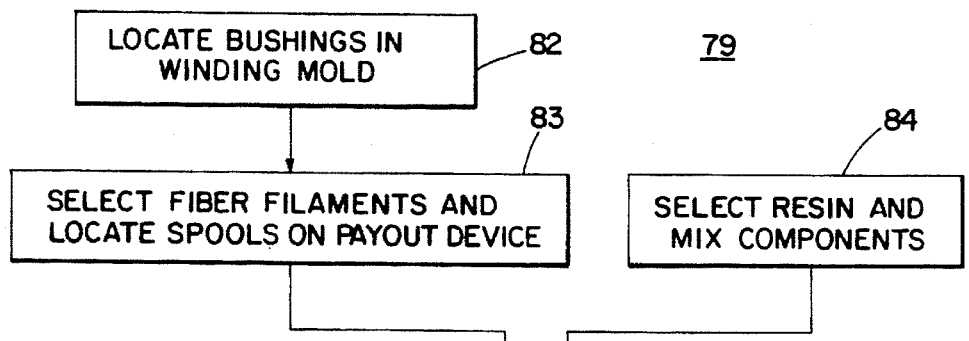
FIG. 8 is a block diagram illustrating a position of the process of the block diagram of FIG. 7.

In FIG. 8, there is shown a block diagram of the step 79 of preparing to mold including the substep 82 of selecting bushings and mounting them in a fixture, the substep 83 of selecting strands and mounting them on a payout device, and the substep 84 of selecting and mixing a resin material that is appropriate for the application. This may be done when weather and impact damage are not factors. Although bushings are not necessary in all embodiments, they should be used in others. They are spool-like composite bushings in the preferred embodiment. They are formed with a strand groove in them of sufficient area to reduce the stress on the bolts. If there are to be no bushings, then the bolts themselves or pins of a diameter equal to the bolts are mounted in a fixture to be wound by strands. The process may include resin application before the strands are wound on the bushings or the resin may be applied after winding.

Strands are selected in accordance with the application of the machine 10 (FIG. 1). The amount of torque, the size of the shafts, the amount of misalignment and the expected rotational speeds all play a role in selecting the strands. Generally, the strands will have high tensile strength, be flexible and elongated. They are wound on the bushings or connectors to form continuous unbroken loops.

If the resin is already in the resin bath, resin is applied at the same time as the strands are wound but if not, a suitable resin may be applied to the strands before winding or may be applied in the mold. The resin is selected so that it may stretch at least as much as the strands will under loading to prevent cracking and must be sufficiently elastomeric or have an appropriate modulus so it will not crack under modest bending.

Figure 9:
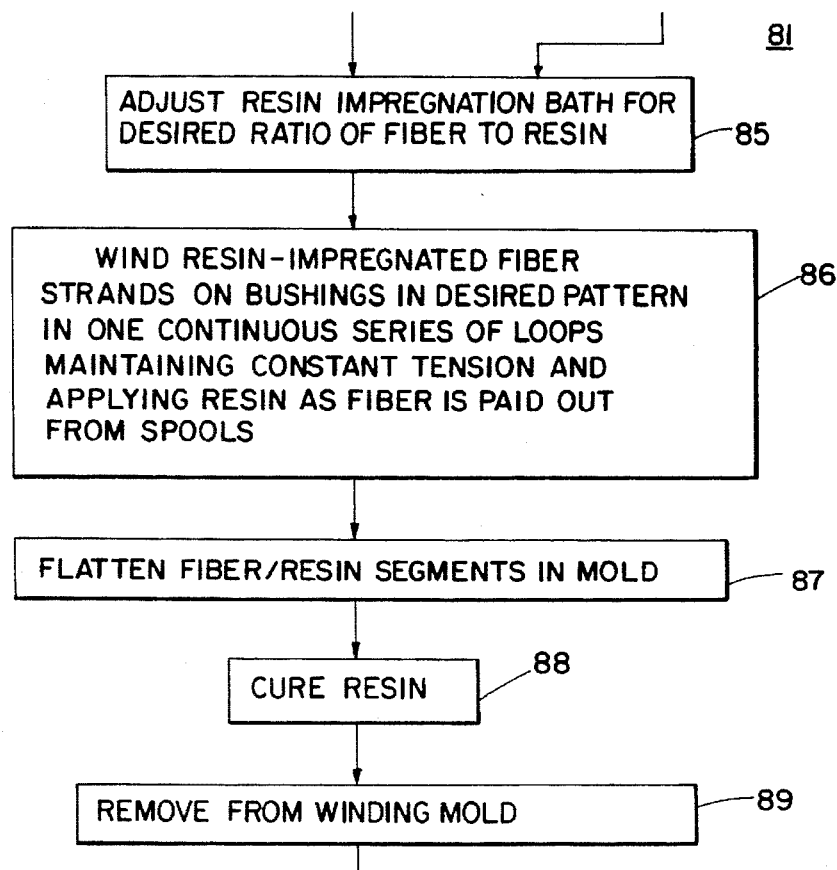
FIG. 9 is a block diagram illustrating another portion of the process of the block diagram of FIG. 7.

In FIG. 9, there is shown a block diagram of the step 81 of molding including the substep 85 of adjusting the resin bath for the desired fiber (resin ratio and impregnating the fibers), the substep 86 of winding the impregnated strands on the bushings, the substep 87 of flattening the segments in the mold, the substep 88 of curing the composite coupling element 30 and the substep 89 of removing the coupling element 30 from the winding mold.

The step 87 of flattening the segments is performed by the mold prior to curing. The depth of the mold is selected so that the thickness of the segment will be between 0.1 percent and 2 percent of its width. The exact value is selected to permit adequate flexing.

Once the winding is performed and the resin is in place, the composite coupling element 30 is cured such as by temperature. The exact curing technique is selected to be appropriate to the resin to be cured but the parameters are controlled to not damage the strands within the resin. A final protective coating may be applied on the outside to increase impact resistance or the like for some applications as in step 90.

Figure 10:
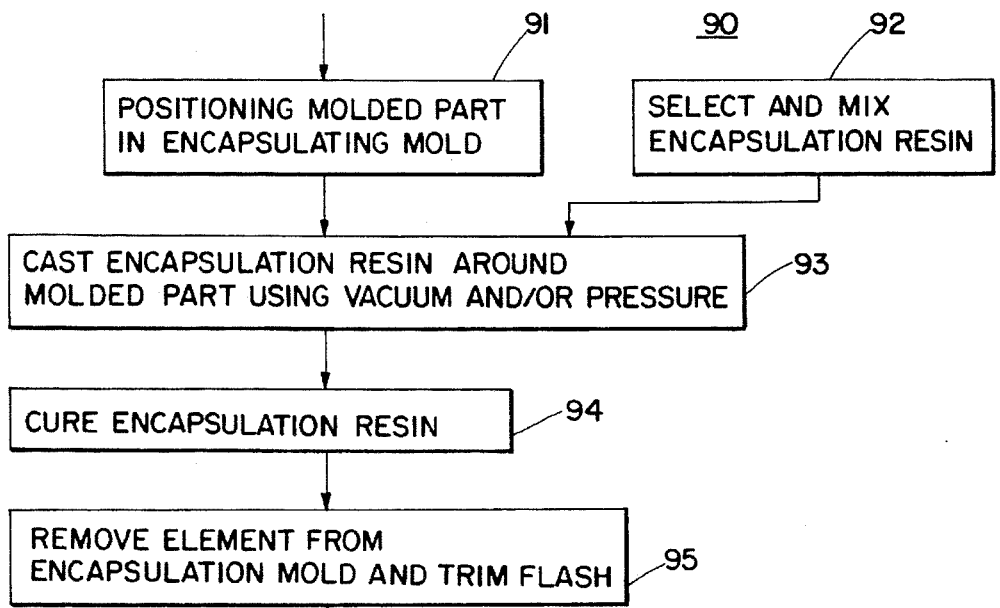
FIG. 10 is a block diagram illustrating still another portion of the process of the block diagram of FIG. 7.

In FIG. 10, there is shown a block diagram of the step 90 of encapsulating including the substep 91 of positioning the molded element obtained from step 89 (FIG. 9) in an encapsulation mold, substep 92 of selecting and mixing the encapsulation resin, the substep 93 of casting the encapsulation resin about the molded element, the step 94 of curing the encapsulation resin, and the substep 95 of removing the encapsulated element 30 from the encapsulation mold. In the preferred embodiment, the step 90 of encapsulating the composite element 30 is done between steps 89 and 96 (FIG. 7) to provide a coat that assists in prevention of damage to the element 30 due to mechanical effects such as foreign objects.

Figure 11:
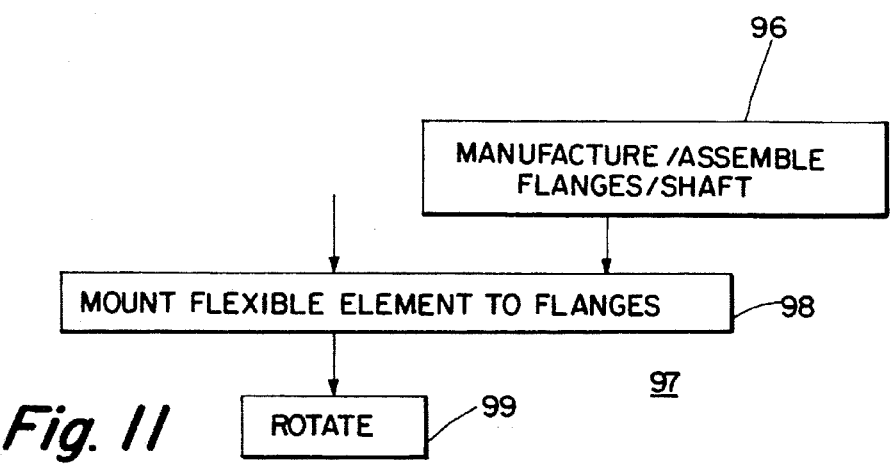
FIG. 11 is a block diagram illustrating still another portion of the process of the block diagram of FIG. 7.

In FIG. 11 there is shown a block diagram of the step 97 of using the coupling including the substep 96 of manufacturing/assembly of the flanges/shaft as needed, the substep 98 of mounting the coupling element to the flanges of the driving and driven shafts and the substep 99 of rotating the driving and driven shafts. Once the composite coupling element 30 has been formed, it is mounted to a driven and driving shaft.

For this purpose, a metallic sleeve or hub in a manner known in the art is attached to the driving shaft and contains an outwardly extending annular flange with fastener holes circumferentially spaced around it and located to accommodate alternate openings in the coupling element. Similarly, the driven shaft has mounted to it a coupling unit having a flange with circumferentially spaced apertures in it aligned with other alternate openings in the composite coupling element 30. The shafts are then aligned with the openings in the flanges and the composite coupling element 30 aligned. Bolts or other fasteners are used to fasten alternate holes in the composite coupling element 30 to the holes in the flange of the driven element. Other bolts or fasteners are used to fasten the apertures in the flange of the driven element to the alternate flanges in the composite coupling element 30.

When the driven and driving elements are coupled together, they may be rotated. When rotated in one direction, the fasteners of the driving shaft pull the strands 56 within the composite coupling element 30 and these strands 56 in turn pull the fasteners of the driven shaft so that they are in tension. The axial misalignment and the angular misalignment of the openings will cause minor flexing of the composite coupling element 30 but this flexing is accommodated easily by the resin and the strands 56 which are especially adapted for such flexing.

Figure 12:
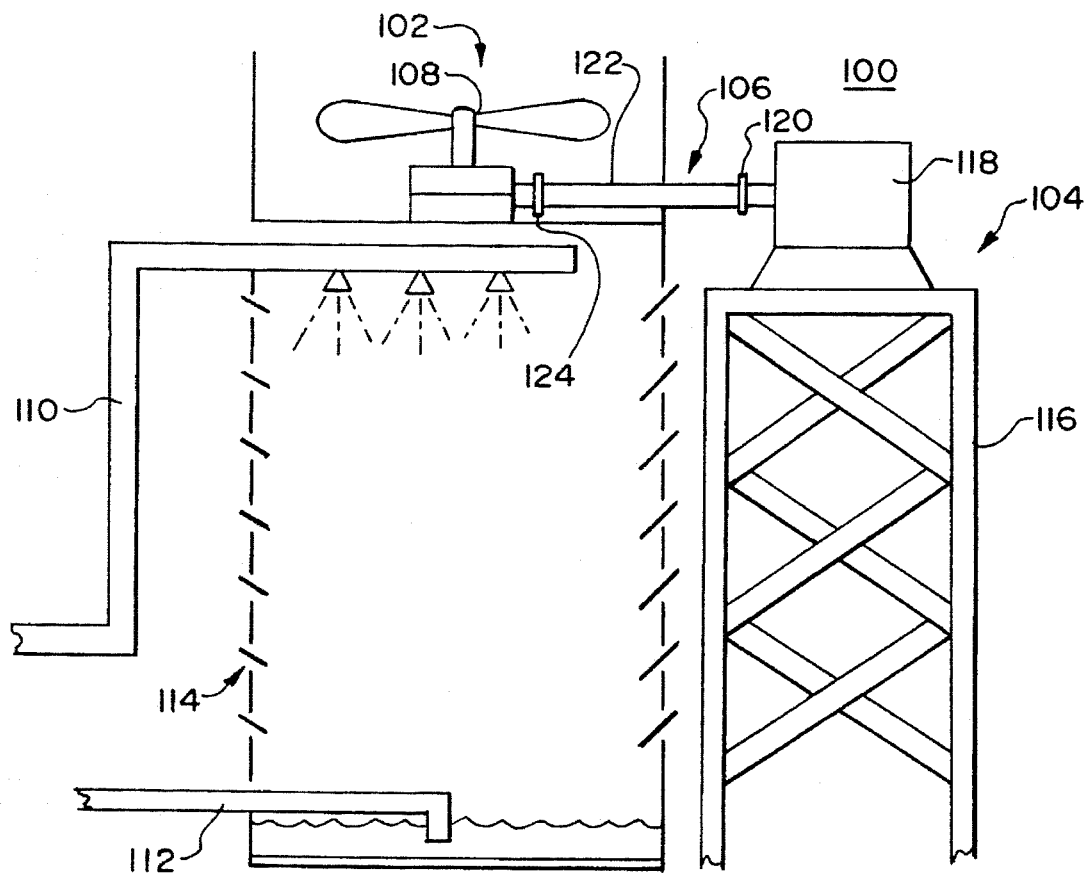
FIG. 12 is a schematic view of a cooling tower illustrating an application of the invention.

In FIG. 12, there is shown a diagramatic view of a cooling tower 100 having a water tower 102, a drive assembly 104, and a coupling shaft assembly 106. The drive assembly 104 is coupled to the water tower 102 through the coupling shaft assembly 106. With this arrangement, the drive assembly 104 rotates the coupling shaft assembly 106 which in turn rotates a fan in the water tower 102 to cool liquid being recirculated through the water tower 102.

The water tower 102 includes a fan assembly 108, a conduit for heated liquid 110, a collecting conduit 112 and a vented tower 114. The conduit for heated liquid 110 is positioned upwardly up near the top of the vented tower 114 and the collecting conduit 112 is positioned near the bottom where liquid collects. The conduit for heated liquid 110 includes a sprayer which sprays liquid downwardly through the vented tower 114 where the liquid is collected for recirculation by the collecting conduit 112. Air is counterflowed upwardly to cool the dropping liquid. The fan assembly 108 is mounted above the conduit for heated liquid 110 and draws air upwardly through the vents of the vented tower 114 to provide the counterflow of cooling air.

To provide a driving force, the drive assembly 104 includes a motor tower 116 and a drive motor 118 with the motor tower 116 being mounted adjacent to the water tower 102 to hold the motor 116 substantially vertically with a gear box for the fan assembly 108.

To drive the fan assembly 108, the coupling shaft assembly 106 includes the driving output shaft of the motor 118, a first composite coupling 120, a centrally located driving shaft 122 and a second composite coupling 124 mounted to the input shaft of the gear box for the fan assembly 108. The coupling 120 mounts the driving shaft 122 to the output shaft of the motor 118 and the coupling 124 mounts the driving shaft 122 to the fan assembly 108. Each of these couplings includes a corresponding set of driving bushings and driven bushings having a plurality of thin composite members so as to rotate the driven shaft and transmit rotational force from the motor 118 to the gear box of the fan assembly 108.

During this rotation, the weight of the shaft assembly 106 creates a tendency for misalignment. Under these conditions, the composite couplings 120 and 124 compensate for such misalignment.

From the above description, it can be understood that the coupling technique of this invention has several advantages such as: (1) it can operate for a long period of time while being subjected to angular misalignments and axial misalignments between the driver and the load of anywhere between 0 degrees and 6 degrees for the angular misalignments and equivalent size of linear dimension excursions due to axial misalignments; (2) it can transmit a wide range or torque in practical sizes ranging from fractional horsepower to hundreds of thousandths of horsepower and is scalable across the ranges with ease; (3) it contains no sliding, rolling or slipping parts which are subject to wear and maintenance problems; (4) it requires no lubrication; (5) it induces low unwanted loads to the shafts and bearing of the driver and to the bearing and shaft of the load; (6) it exhibits high inherent resistance to corrosion; (7) it provides high resistance to fatigue failure; and (8) it is relatively inexpensive, simple to make and in a practical size for a wide range of applications.

Although a preferred embodiment of the invention has been described with some particularity, many modifications and variations in the invention are possible within the light of the above teachings. Therefore, it is to be understood that, within the scope of the appended claims, the invention may be practiced other than as specifically described.

What is claimed is:

1. A composite coupling element comprising:

an element body;

a driving shaft;

a driven shaft;

a plurality of fasteners;

a plurality of bushings;

a plurality of bearing surfaces;

a plurality of first fastener means for fastening the element body to the driving shaft;

a plurality of second fastener means for fastening the element body to the driven shaft;

at least some of said first fastener means being spaced substantially in a circle on said element body;

at least some of said second fastener means being spaced substantially in said circle on said element body;

said first and second fastener means dividing said circle into segments, each of said segments containing composite material having strands extending between one of the first fastener means and one of the second fastener means;

said first and second fastener means being connected by the segments of composite material having strands extending between the first and second fastener means wherein said first fastener means applies force to the second fastener means through the strands within said composite material;

each of the first and second fastener means includes a different one of said plurality of bushings for accommodating a corresponding one of said plurality of fasteners; the first and second fastener means each having a different one of the bearing surfaces against the fastener means and a different one of the bearing surfaces for a plurality of strands; each bearing surface having an area; whereby the areas of the bearing surfaces reduce stress to a tolerable level in the strands and provide adequate bearing surfaces to reduce stress on the fastener;

the diameter of each of the fastener means from the center to the bearing surface for the strands being from 1/64 to 1/4 of the diameter of the coupling element.

2. A composite coupling element in accordance with claim 1 in which said strands are composed of zero twist fibers having diameters in the range of 5 to 15 microns, whereby a large ratio of surface area contact of fiber to composite material is provided.

3. A composite coupling element in accordance with claim 2 in which said composite material is a non-elastomeric epoxy resin having a maximum elongation at least equal to that of the strands and having a modulus of elasticity of between 350,000 and 650,000.

4. A composite coupling element in accordance with claim 1 in which some of said segments include fewer strands than adjacent segments, whereby said some of said segments are more easily able to bend.

5. A machine comprising:

a motor;

a driven device;

a motor output shaft mounted to the motor for rotation thereby to delivery torque having a maximum, a minimum and intermediate torque;

an input shaft mounted to the driven device for rotation therewith;

coupling means mounted to said output shaft of said motor;

said coupling means including a flexible coupling element;

said flexible coupling element including a plurality of fastener means, said fastener means including a plurality of first fastener means adapted to be connected in driven relationship to said output shaft of said motor and a plurality of second fastener means adapted to be connected in driving relationship to said input shaft of said driven device;

each of said first and second fastener means having a different center;

a plurality of strands connecting different ones of said first fastener means to different ones of said second fastener means, whereby said first fastener means apply force to said second fastener means to transmit torque;

said strands being looped around said first and second fastener means;

said coupling element having a thickness in the range of 0.05 percent to 4 percent of its diameter;

said strands being held together by resin;

each of said strands comprising continuous zero twist fibers having a fiber length at least twice the distance between adjacent ones of said first and second fastener means and aligned within 30 degrees of the line defined between the centers of adjacent first and second fastener means, said fibers having an ultimate tensile strength of at least 300,000 psi and strain to failure of at least 1.2 percent;

said strands having a maximum elongation sufficient to compensate for both torque transmission and bending.

6. A machine in accordance with claim 5 in which each of the fastener means is connected to its two adjacent fastener means by strands, whereby the coupling element couples said motor output shaft and said input shaft mounted to said driven device which may rotate in either clockwise or counterclockwise directions.

7. A machine in accordance with claim 5 in which the strands are wound in a loop around adjacent fastener means.

8. A machine according to claim 5 in which said strands form a circle having a center, a radius, a cross-sectional area and a tensile modulus; and the number of fastener means is at least twice the maximum torque delivered by the motor output shaft divided by the strain permissible on a strand, a safety factor of at least two, the radius of the circle formed by the strands from the center, and the total strand cross-sectional area and the tensile modulus of the strand.

9. A machine according to claim 5 in which said strands form a circle having a center, a radius, a cross-sectional area and a tensile modulus; and the number of fastener means is at least twice the maximum torque provided by the motor output shaft to the input shaft of the driven device divided by the radius, divided by the cross-sectional area and by stress caused on a fiber by the combined effects of torque and misalignment multiplied by a safety factor of at least two.

10. A machine in accordance with claim 5 in which the strands are wound in a pattern which crosses near the center of a location between adjacent fastener means and is looped in opposite directions around adjacent fastener means.

11. A machine in accordance with claim 5 in which there are segments between the fastener means; and the segments between the fastener means are filled with fiber within a range of 10 percent to 75 percent.

12. A machine in accordance with claim 5 in which said strands form a circle having a center, a radius, a cross-sectional area and a tensile modulus; and there are segments between the fastener means having thickness; and the thickness of the segments between the fastener means is in a range of 0.1 percent to 2 percent of the diameter of the circle diagonally from fastener means to fastener means.

13. A machine according to claim 5 in which said strands form a circle having a center, a radius, a cross-sectional area and a tensile modulus, said circle having segments between the fastener means and the width of the segments is within a range of 1/64 to 1/4 of the diameter of the circle.

14. A machine in accordance with claim 5 in which said strands form a circle having a center, a radius, a cross-sectional area and a tensile modulus, and the circle being divided into segments by the fastener means; and the cross sectional area of the segment filled with strands is at least equal to twice the torque expected to be imposed upon the coupling element by the motor output shaft and input shaft of the driven device divided by the radius of the coupling element, the number of segments, the modulus of elasticity, and the strain due to the combined effects of torque and misalignment multiplied by a safety factor of at least 2.

15. A machine in accordance with claim 5 in which said strands form a circle having a center, a radius, a cross-sectional area and a tensile modulus, said circle having segments between the fastener means; and the cross sectional area of the segment occupied by strands is at least equal to twice the maximum torque imposed by the motor output shaft against the input shaft mounted to the driven device, divided by the radius of the coupling element, the number of segments, and the maximum stress to be imposed upon a filament by the combined effects of torque and misalignment multiplied by a safety factor of at least two.

16. A method comprising the steps of:

placing a plurality of first fastener means for fastening a composite element body to a driving shaft in a fixture;

placing a plurality of second fastener means for fastening a coupling body to a driven shaft in the same fixture;

winding continuous filaments comprising zero twist fibers between the first and second fastener means wherein said first fastener means are each connected to adjacent second fastener means; and applying a resin to the continuous filaments and curing the assembly in the fixture to form a solid body.

17. A method in accordance with claim 16 in which the step of winding includes the step of winding filaments about each of the fastener means so that each fastener means is connected to its two adjacent fastener means by filaments, whereby the coupling body functions with the driving shaft which may rotate in either clockwise or counter-clockwise directions.

18. A method according to claim 16 in which the step of placing the fastener means in a fixture includes the step of placing a number of fastener means less than twice the maximum torque delivered by the driving shaft divided by the strain permissible on a filament, a safety factor of at least two, the radius of a circle formed by the filaments from the center, the total filaments cross-sectional area and the tensile modulus of the filaments.

19. A method in accordance with claim 16 in which the step of winding filaments includes the step of providing sufficient loops to fill the space between fastener means with fiber within a range of 10 percent to 75 percent of the total volume of the space between the fastener means.

20. An industrial cooling tower comprising:

a driving motor having a driving shaft;

a fan having an input shaft adapted to rotate the fan;

means for transporting liquid to be cooled to a location in a flow path of said fan;

a coupling shaft assembly connecting a motor output shaft to the input shaft of said fan;

said coupling shaft assembly including at least one composite coupling element;

said composite coupling element including a plurality of first fastener means adapted to be connected in driven relationship to said output shaft of said motor and a plurality of second fastener means adapted to be connected in a driving relationship to said input shaft of a driven device;

said first and second fastener means each having a center;

a plurality of strands connecting different ones of said first fastener means to different ones of said second fastener means, whereby said first fastener means apply force to said second fastener means to transmit torque;

said strands being looped around said fastener means;

said composite coupling element having a thickness in the range of 0.05 percent to 4 percent of its diameter;

said strands being held together by resin;

said strands being continuous zero twist fibers, each having a fiber length at least twice the distance between adjacent ones of said first and second fastener means and aligned within 30 degrees of a line defined between the centers of adjacent fastener means, said fibers having an ultimate tensile strength of at least 300,000 psi in a strain to failure of at least 1.2 percent.

21. A method comprising the steps of:

placing one of a plurality of first means for fastening a composite element body to a driving shaft in a fixture;

placing one of a plurality of second means for fastening a coupling body to a driven shaft in the same fixture;

winding continuous filaments comprising zero twist fibers around the one of the first plurality of means for fastening and the one of the second plurality of means for fastening wherein one of the plurality of first means for fastening is connected to said one of the plurality of second means for fastening; and applying a resin to the continuous filaments wherein the filaments are embedded in the resin and curing the resin in the fixture to form a solid composite body;

repeating the process with others of the first plurality and second plurality of means for fastening wherein a plurality of composite bodies are formed; and connecting the composite bodies in a circle having a diameter sufficiently large to reduce stresses caused by torque transmission and axial misalignment to a minimum and sufficiently small to reduce weight and provide ease of installation and filling in any other voids with resin; wherein a coupling member is formed for connecting a driving shaft to a driven shaft.

* * * * *